United States Patent
Mengwasser et al.

(10) Patent No.: US 12,532,303 B2
(45) Date of Patent: Jan. 20, 2026

(54) SYSTEMS AND METHODS FOR VIRTUALIZED DOMAIN PROXY CONTROL

(71) Applicant: DISH Wireless L.L.C., Littleton, CO (US)

(72) Inventors: Brian Mengwasser, Denver, CO (US); Christopher Ergen, Littleton, CO (US)

(73) Assignee: DISH Wireless L.L.C., Littleton, CO (US)

(*) Notice: Subject to any disclaimer, the term of this patent is extended or adjusted under 35 U.S.C. 154(b) by 393 days.

(21) Appl. No.: 18/191,680

(22) Filed: Mar. 28, 2023

(65) Prior Publication Data
US 2023/0309074 A1  Sep. 28, 2023

Related U.S. Application Data

(60) Provisional application No. 63/324,507, filed on Mar. 28, 2022.

(51) Int. Cl.
| | |
|---|---|
| *H04W 72/0453* | (2023.01) |
| *H04L 43/10* | (2022.01) |
| *H04W 72/50* | (2023.01) |
| *H04W 88/04* | (2009.01) |
| *H04W 88/18* | (2009.01) |

(52) U.S. Cl.
CPC ......... *H04W 72/0453* (2013.01); *H04L 43/10* (2013.01); *H04W 72/535* (2023.01); *H04W 88/04* (2013.01); *H04W 88/182* (2013.01)

(58) Field of Classification Search
CPC .......... H04W 72/0453; H04W 72/535; H04W 88/04; H04W 88/182; H04W 16/14; H04L 43/10
See application file for complete search history.

(56) References Cited

U.S. PATENT DOCUMENTS

| | | | | |
|---|---|---|---|---|
| 12,089,240 | B2* | 9/2024 | Sevindik | H04B 17/318 |
| 2019/0335336 | A1* | 10/2019 | Cimpu | H04W 28/16 |
| 2019/0364435 | A1* | 11/2019 | Ahmavaara | H04W 72/541 |
| 2020/0305159 | A1* | 9/2020 | Raghothaman | H04W 72/0453 |
| 2021/0360627 | A1* | 11/2021 | Hafeez | H04L 27/0006 |
| 2022/0345896 | A1* | 10/2022 | Ahmed | H04W 24/02 |

* cited by examiner

*Primary Examiner* — Yu-Wen Chang
(74) *Attorney, Agent, or Firm* — Kilpatrick Townsend & Stockton LLP

(57) ABSTRACT

Systems, machine-readable media, and methods may facilitate controlling use of a radio frequency band. A communication device of a set of communication devices may be communicated with, and device specifications may be collected. Device parameters corresponding to the communication device may be detected. The device parameters may include a specification of a location. A coexistence composite may be determined based on the device parameters. Specifications corresponding to the coexistence composite may be developed. At least part of the specifications of the coexistence composite may be communicated with a radio frequency allocation system. Consequent to the communicating with the radio frequency allocation system, a radio frequency assignment and operating parameters for the coexistence composite may be identified. The communication device may be controlled to access the radio frequency band in accordance with the radio frequency assignment and the operating parameters for the coexistence composite.

24 Claims, 6 Drawing Sheets

SYSTEMS AND METHODS FOR VIRTUALIZED DOMAIN PROXY CONTROL

CROSS REFERENCE TO RELATED APPLICATIONS

This application claims priority to U.S. Provisional Patent Application No. 63/324,507, filed on Mar. 28, 2022, the disclosure of which is incorporated by reference in its entirety for all purposes.

FIELD

Disclosed embodiments according to the present disclosure relate generally to radio frequency communications, and in particular to systems, methods, and computer-readable media for virtualized domain proxy control.

BACKGROUND

Radio frequencies are widely used by a variety of communication devices and are subject to governmental regulation that impose restrictions on the use of radio frequency spectrum. For example, CBRS (Citizens Broadband Radio Service) is a broadcast band corresponding to 3550 MHz to 3700 MHz that, in the United States, that is regulated by the FCC (Federal Communications Commission). The CBRS band is co-used by military and other high-priority entities and applications that are accordingly treated as top-tier incumbent users of CBRS that have highest priority access to CBRS. Other, lower-tier users of CBRS are regulated so as to limit interference with higher-tier users. Accordingly, the conventional CBRS system includes centralized controllers that enforce regulations on the population of CBRS devices (CBSDs) that uses the CBRS band and that includes second-tier, priority access license (PAL) users and bottom-tier, general authorized access (GAA) users.

A Spectrum Access System (SAS) is such a centralized controller that is a radio frequency allocation system and enforces the regulations on the population of CBSDs that share the frequency band. In order for a CBSD with an access point to use this particular frequency channel, the CBSD is required to pass information to the SAS and comply with commands from the SAS. When the SAS detects potential interference with incumbent access uses, the SAS will shut down interfering CBSDs. However, while the SAS controls interference with respect to high-priority uses, interference amongst the non-high-priority uses (e.g., PAL and GAA uses) remains potentially problematic. Further, the SAS provides very minimal functionality with respect to the population of CBSDs in the second and third tiers.

There are needs for more tailored service offerings for CBSDs. Thus, there is a need for systems and methods that address such problems. This and other needs are addressed by the present disclosure.

BRIEF SUMMARY

Certain embodiments of the present disclosure relate generally to deployment pipelines, and in particular to systems, methods, and computer-readable media for accelerating software change requests in deployment pipelines.

In one aspect, a system to facilitate controlling use of a radio frequency band is disclosed. The system may include one or more processing devices and memory communicatively coupled with and readable by the one or more processing devices and having stored therein processor-readable instructions which, when executed by the one or more processing devices, cause the one or more processing devices to perform one or a combination of the following operations. A set of one or more communication devices may be controlled, where each communication device of the set of one or more communication devices is adapted to communicate via radio frequency communications, so that the set of one or more communication devices accesses a radio frequency band. The controlling may be based at least in part on one or a combination of the following. A communication device of the set of one or more communication devices may be communicated with, and device specifications corresponding to the communication device may be collected. A set of one or more device parameters corresponding to the communication device may be detected. The set of one or more device parameters may include a specification of a location of the communication device. A coexistence composite may be determined based at least in part on the set of one or more device parameters. Specifications corresponding to the coexistence composite may be developed. At least part of the specifications of the coexistence composite may be communicated with a radio frequency allocation system. Consequent to the communicating with the radio frequency allocation system, a radio frequency assignment and operating parameters for the coexistence composite may be identified. The communication device may be controlled to access the radio frequency band in accordance with the radio frequency assignment and the operating parameters for the coexistence composite.

In another aspect, a method to facilitate controlling use of a radio frequency band is disclosed and may include one or a combination of the following. A domain controller may perform one or a combination of the following. A set of one or more communication devices may be controlled, where each communication device of the set of one or more communication devices is adapted to communicate via radio frequency communications, so that the set of one or more communication devices accesses a radio frequency band. The controlling may be based at least in part on one or a combination of the following. A communication device of the set of one or more communication devices may be communicated with, and device specifications corresponding to the communication device may be collected. A set of one or more device parameters corresponding to the communication device may be detected. The set of one or more device parameters may include a specification of a location of the communication device. A coexistence composite may be determined based at least in part on the set of one or more device parameters. Specifications corresponding to the coexistence composite may be developed. At least part of the specifications of the coexistence composite may be communicated with a radio frequency allocation system. Consequent to the communicating with the radio frequency allocation system, a radio frequency assignment and operating parameters for the coexistence composite may be identified. The communication device may be controlled to access the radio frequency band in accordance with the radio frequency assignment and the operating parameters for the coexistence composite.

In yet another aspect, one or more non-transitory, machine-readable media to facilitate controlling use of a radio frequency band are disclosed. The one or more non-transitory, machine-readable media may have machine-readable instructions thereon which, when executed by one or more processing devices, cause the one or more processing devices to perform one or a combination of the following operations. A set of one or more communication devices may be controlled, where each communication device of the set of one or more communication devices is adapted to communicate via radio frequency communications, so that the set of one or more communication devices accesses a radio frequency band. The controlling may be based at least in part on one or a combination of the following. A communication device of the set of one or more communication devices may be communicated with, and device specifications corresponding to the communication device may be collected. A set of one or more device parameters corresponding to the communication device may be detected. The set of one or more device parameters may include a specification of a location of the communication device. A coexistence composite may be determined based at least in part on the set of one or more device parameters. Specifications corresponding to the coexistence composite may be developed. At least part of the specifications of the coexistence composite may be communicated with a radio frequency allocation system. Consequent to the communicating with the radio frequency allocation system, a radio frequency assignment and operating parameters for the coexistence composite may be identified. The communication device may be controlled to access the radio frequency band in accordance with the radio frequency assignment and the operating parameters for the coexistence composite.

In various embodiments, a second communication device of the set of one or more communication devices may be communicated with and second device specifications corresponding to the second communication device may be collected. A second set of one or more device parameters corresponding to the second communication device may be detected. The second communication device may be matched to the coexistence composite based at least in part on the second set of one or more device parameters. Based at least in part on the matching, a second set of specifications corresponding to the coexistence composite may be developed. In various embodiments, at least part of the second set of specifications of the coexistence composite may be communicated with the radio frequency allocation system. Consequent to the communicating with the radio frequency allocation system, the second communication device may be controlled to access the radio frequency band in accordance with the radio frequency assignment and the operating parameters and/or a second set of operating parameters for the coexistence composite.

In various embodiments, prior to the controlling the communication device to access the radio frequency band, content corresponding to the coexistence composite may be communicated to the communication device. A response from the communication device may be received, and an acknowledgement of the coexistence composite may be identified. In various embodiments, one or both of the communicating the at least part of the specifications of the coexistence composite with the radio frequency allocation system and the controlling the communication device to access the radio frequency band may be contingent on the acknowledgement. In various embodiments, heartbeat communications from the communication device may be monitored. Corresponding heartbeat communications may be relayed to the radio frequency allocation system as a proxy for the communication device. In various embodiments, an interruption in the heartbeat communications from the communication device may be detected. Relaying the corresponding heartbeat communications to the radio frequency allocation system may be continued during the interruption.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
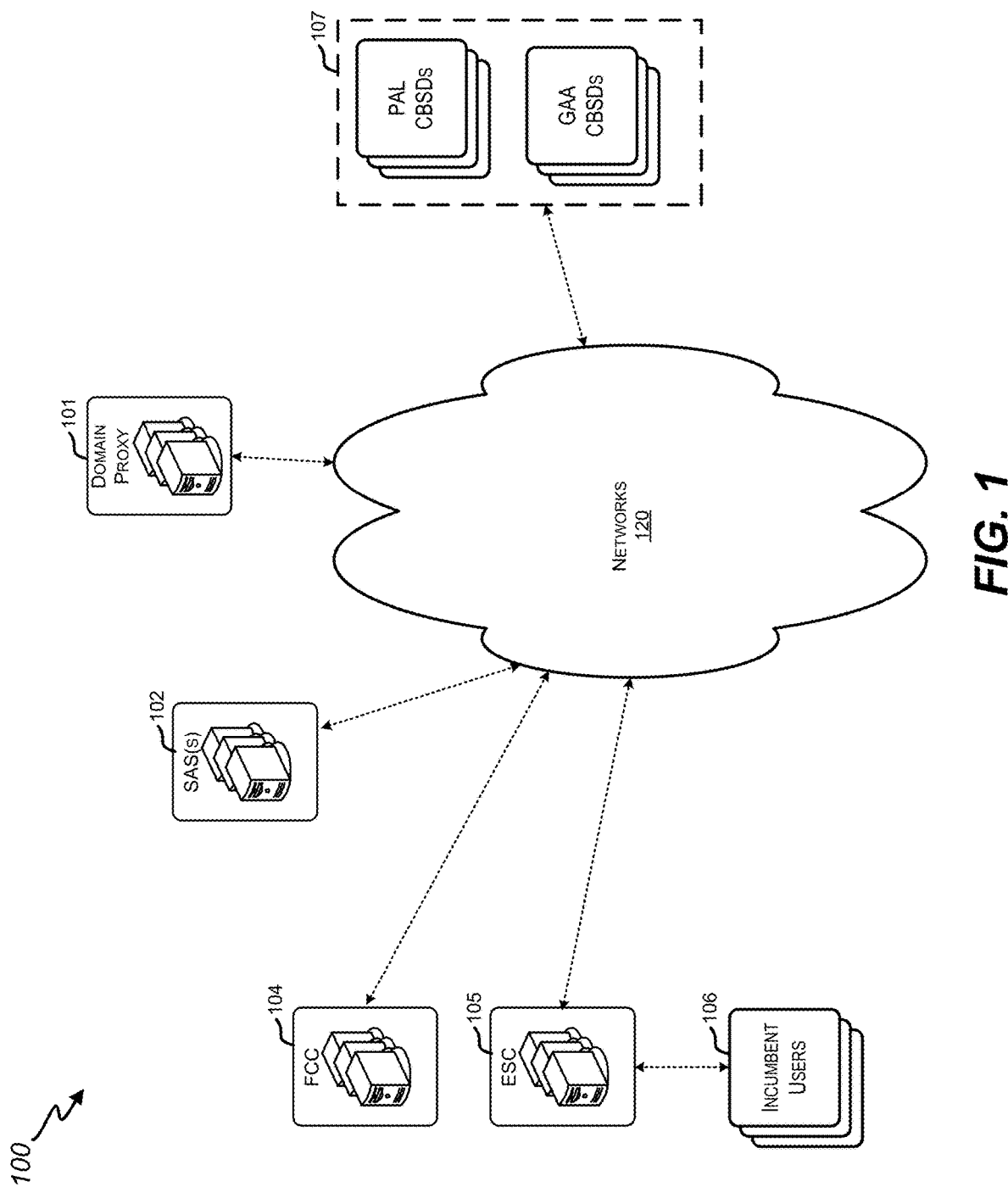
FIG. 1 illustrates a high-level block diagram of a system, in accordance with embodiments according to the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments according to the present disclosure may provide for technological solutions to multiple problems existing with conventional systems, devices, and approaches. Conventional systems and devices are deficient in addressing changing needs and contexts that depend on a variety of factors. The lack of flexibility, speed, and device intelligence to address the changes compromises outcomes for systems and user devices. Various embodiments according to the present disclosure may provide for granular and adaptive data security solutions for mobile devices, where the solutions are at least partially a function of various locations, various communication sources, various events, the content of various communications, and/or the like.

Disclosed embodiments may provide for virtualized control and services for radio frequency communication devices that are applicable to, but not exclusively applicable to, CBRS devices and networks of CBRS devices that can use the CBRS spectrum. In some embodiments, such control and services may correspond to virtualized domain proxy control in wireless networks. For example, disclosed embodiments may provide for control of, and services for, lower-tier CBRS devices (e.g., devices seeking/using PAL and GAA access). Various embodiments will now be discussed in greater detail with reference to the accompanying figures, beginning with FIG. 1.

FIG. 1 depicts a high-level schematic diagram of a system 100, in accordance with certain embodiments of the present disclosure. The schematic diagram depicts aspects of a physical architecture for a radio frequency communication network, such as a CBRS network. As depicted, the system 100 includes one or more SASs 102 communicatively coupled or couplable to a regulatory system 104, an environmental sensing capability system 105, and incumbent user devices and systems 106. Although FIG. 1 illustrates an example that includes SASs 102, it should be understood that disclosed embodiments are extensible to Incumbent Informing Capability (IIC) paradigm different mechanisms that may fulfill the role of the SAS 102 in the future, which are integrated into the incumbent users and may be potentially distributed in nature.

Further, the one or more SASs 102 are communicatively coupled or couplable to a domain proxy control system 101. The domain proxy control system 101 may be communicatively coupled or couplable to CBRS devices 107 (CBSDs 107), for example, by way of one or more networks 120 that may include and/or otherwise be communicatively coupled to CBSD access points 103. The domain proxy control system 101 may work on behalf of the CBSDs 107 and may communicate with the one or more SASs 102 on behalf of the CBSDs 107 as a master domain proxy. Advantageously, the domain proxy control system 101 working on behalf of multiple CBSDs 107 may be scalable to many CBSDs 107, so only the one domain proxy control system 101 is needed for N number of devices.

In general, the system 100 may include one or more networks 120 that can be used for bi-directional communication paths for data transfer between components of system 100. Disclosed embodiments may transmit and receive data, including video content, via the networks 120 using the CBRS spectrum and any suitable protocols, standards and technology implementations, including 5G, 4G, LTE (Long-Term Evolution), 3G, GSM (Global System for Mobile Communications), and/or the like disclosed herein. In various embodiments, the CBSDs 107 may correspond to CBRS access points that may be of any suitable type or types that provide RF access, including gateways, routers, base stations, eNode Bs, other CBSDs, and/or the like configured to provide access to the CBRS spectrum and/or other mediums of the networks 120.

The CBSDs 107 may be separate from, but communicatively coupled to, the networks 120. The networks 120 may include the infrastructure to allow for RF communications in whole or in part between the components of the system 100. For example, in some instances, the networks 120 and CBSDs 107 may allow for purely RF communications between the CBSDs 107 and the domain proxy controller 101, and/or between the domain proxy controller 101 and the SAS 102. In other instances, communications between such components may be through other communication means disclosed herein alone or in combination with RF communications.

The CBSDs 107 may include and/or provide CBRS access to any one or combination of various communication devices adapted to communicate via radio frequency communications. The CBSDs 107 may, for example, include, be integrated with, be communicatively coupled to, and/or otherwise correspond to a cellular phone, a laptop computer, a smartphone, a tablet computer, smart glasses, a smart watch, another type of wearable computerized device, a vehicle computer, handheld walkie-talkie-like devices, and/or the like mobile devices; a desktop computer, a smart speaker, and/or the like non-mobile devices; internet-of-things (IOT) devices that may include one or more IOT sensors; gateways, routers, and/or the like; and/or any communication device including, for example, at least one antenna and/or other transceiving equipment and configured for radio frequency (RF) communications via the CBRS spectrum and RF networks. For example, in various embodiments, the CBSDs 107 may be portable handheld devices (e.g., an iPhone®, cellular telephone, an iPad®, computing tablet, a personal digital assistant (PDA)) or wearable devices (e.g., Google Glass® device, a smart watch, and/or the like), running software such as Microsoft Windows Mobile®, and/or a variety of mobile operating systems such as iOS, Windows Phone, Android, and/or the like, and being Internet, e-mail, short message service (SMS), and/or other communication protocol enabled. In various embodiments, the CBSDs 107 may be configured to operate a client application such as a web browser, a proprietary client application, a web-based application, an entity portal, a mobile application, a widget, or some other application, which may be used by users of the CBSDs 107 to interact with the domain proxy control system 101 to use services provided by the domain proxy control system 101.

The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as RF, optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE, 3G, GSM, another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In some embodiments, the networks 120 may include a telephone network that may be circuit switched, package switched, or partially circuit switched and partially package switched. For example, the telephone network may partially use the Internet to carry phone calls (e.g., through VoIP). In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

In some instances, CBRS access may be provided to CBSDs 107 as follows. A CBSD 107 may contact the SAS 102 via one or more networks and may request permission to use a certain portion of the CBRS spectrum. A SAS 102 may include one or more servers that may act as a permitting device. In some instances, a CBSD 107 may request access from the SAS 102 via the Internet. In some instances, in order to provide a connection for CBSDs 107 that are unable to request permission to use the CBRS spectrum without using the CBRS spectrum, a CBSD 107 may request access from the SAS 102 via an RF link for a limited time for the sole purpose of requesting access. The CBSD 107 may provide its physical location to the SAS 102, and the SAS 102 may grant access to the CBSD 107 under certain conditions when the access of the CBSD 107 would not interfere with high-priority uses. For continued access, the CBSD 107 must regularly communicate with the SAS 102 (e.g., via heartbeat communications) to ensure that the circumstances for continued access remain unchanged. The CBSD 107 must cease using the CBRS spectrum within a predetermined amount of time if the CBSD 107 cannot confirm with its regular communications to the SAS 102 that the grant of access continues and/or if the SAS 102 issues a command (e.g., a shutdown command) to cease using the CBRS spectrum (e.g., if continued access by the CBRS would or could potentially cause interference with high-priority uses).

However, in various embodiments according to the present disclosure, the domain proxy control system 101 may provide for virtualized domain proxy control and services that facilitate that CBRS access to CBSDs 107. Embodiments disclosed may be virtualized, where virtualized may correspond to being operated in the cloud, with corresponding and typical cloud benefits like scaling, parallel deploy/upgrade, redundancy, etc. Advantageously, as SAS systems 102 may also be deployed in the cloud, disclosed embodiments of domain proxy control and services being virtualized may provide for logical proximity to the SAS systems 102. The domain proxy control system 101 may provide virtualized services for CBSDs 107 and may control use of a radio frequency band as disclosed further herein. The domain proxy control system 101 may control many sets of CBSDs 107 so that each set of CBSDs 107 accesses a radio frequency band. For example, the domain proxy control system 101 may manage interference at the lower tiers, may provide services to the lower tiers, and may cause collaboration. In various embodiments, each set of CBSDs 107 may access a different radio frequency band and/or utilize a different set of one or more frequencies within the radio frequency band.

Figure 2:
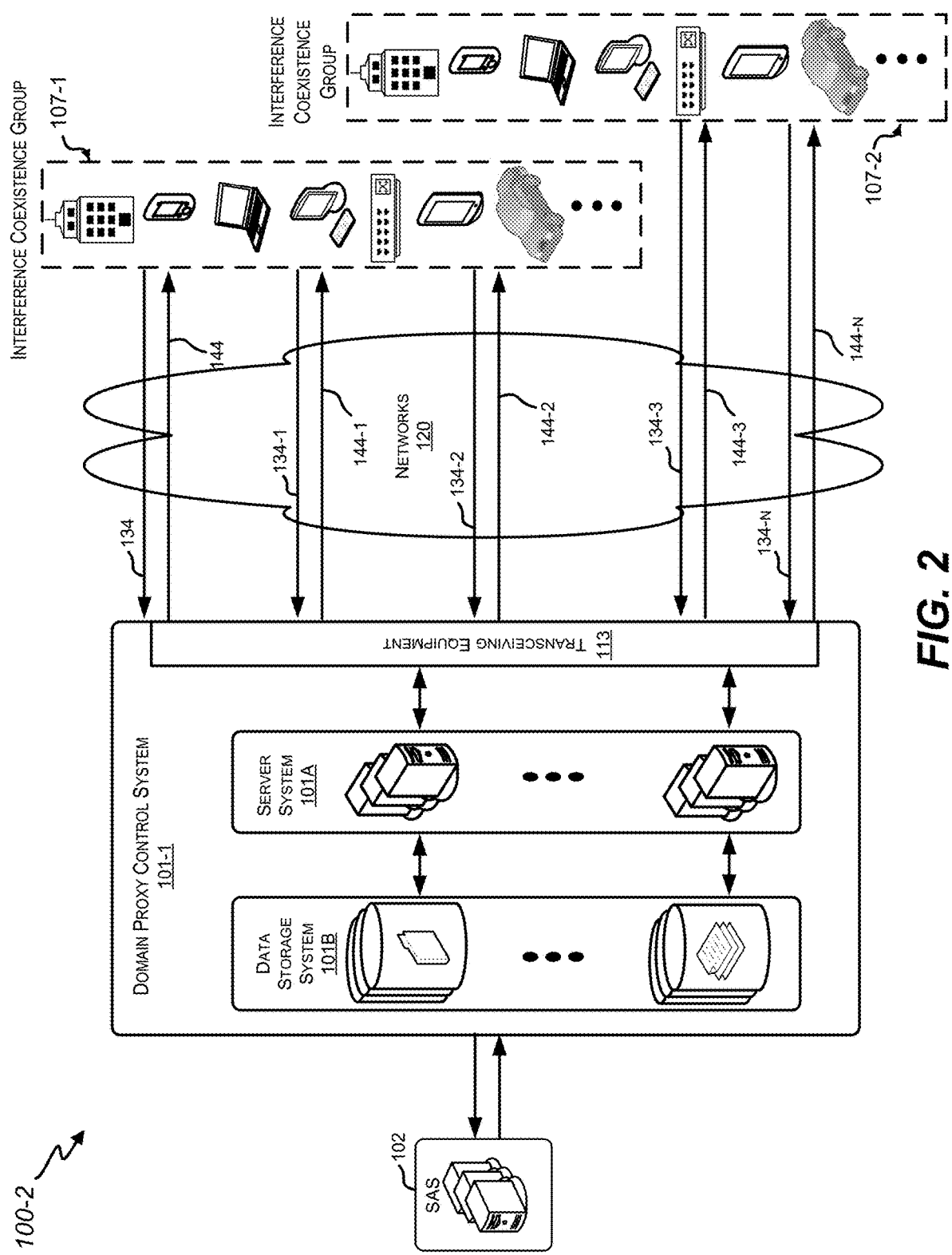
FIG. 2 illustrates a simplified diagram of a distributed network for implementing various embodiments of the system, in accordance with embodiments according to the present disclosure.

Various aspects of the domain proxy control system 101 are elaborated upon with respect to FIG. 2 and the subsequent figures. FIG. 2 depicts a simplified diagram of a distributed network 100-1 for implementing various embodiments of the system 100 in accordance with present disclosure. The domain proxy control system 101 (which may be referenced as the domain controller) may include a server system 101A and a data storage system 101B. The domain proxy control system 101, operating as a master domain proxy for the CBSDs 107, may be logically near the SAS 102. Accordingly, the domain proxy control system 101 may provide for virtualized domain proxy services, where the master domain proxy is in the cloud logically near the SAS 102, advantageously providing higher reliability and geo-redundancy, among other advantages.

In various embodiments, the domain proxy control system 101 may include a set of devices configured to process, transform, encode, translate, send, receive, retrieve, detect, generate, compute, organize, categorize, qualify, store, display, present, handle, or use information and/or data suitable for the embodiments described herein. For example, servers of the domain proxy control system 101 may be used to store software programs and data. Software implementing the systems and methods described herein may be stored on storage media in the servers. Thus, the software may be run from the storage media in the servers. In some embodiments, software implementing the systems and methods described herein may be stored on storage media of other devices described herein. The domain proxy control system 101 may be implemented in or with a distributed computing and/or cloud computing environment with a plurality of servers and cloud-implemented resources. The domain proxy control system 101 may include processing resources communicatively coupled to storage media, random access memory (RAM), read-only memory (ROM), and/or other types of memory. The domain proxy control system 101 may include various input and output (I/O) devices, network ports, and display devices. Some embodiments of the domain proxy control system 101 may facilitate searching of one or more information repositories in response to data received over the one or more networks 120 from any one or combination of the interfaces.

In various embodiments, the domain proxy control system 101 may be containerized, cloud-native, and/or composed of one or more specialized computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Accordingly, the domain proxy control system 101 may also run on server and storage systems that are not part of the system, such that the system 101 is portable across hardware. In various embodiments, server system 101 may be adapted to run one or more services described herein. The domain proxy control system 101 may run an operating system, which may correspond to a server operating system. The domain proxy control system 101 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

The server system 101A may include one or more system coordination servers. The system coordination servers may include any suitable type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. System coordination servers may include one or more server farms, clusters, or any other appropriate arrangement and/or combination or computer servers. System coordination servers may operate according to stored instructions located in a memory subsystem of the servers, and may run an operating system, including any suitable server operating system and/or any other operating systems discussed herein.

The data storage system 101B may include one or more data storage servers, which may include file-based storage systems, block storage systems, and/or cloud object storage systems. Data storages may comprise stored data germane to the functions of the domain proxy control system 101. Illustrative examples of data storages that may be maintained in certain embodiments of the network are described below. In some embodiments, multiple data storages may reside on a single server, either using the same storage components of the server or using different physical storage components to assure data security and integrity between data storages. In other embodiments, each data storage may have a separate dedicated data storage server.

The data storage servers can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the data storage server, and particularly, the tier 0 storage is the fastest storage that is not RAM or cache memory. In some embodiments, the tier 0 memory can be embodied in solid state memory such as, for example, a solid-state drive (SSD) and/or flash memory. In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any correct level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives. In some embodiments, the one or several hardware and/or software components of the data storage server can be arranged into one or several storage area networks (SAN), which one or several storage area networks can be one or several dedicated networks that provide access to data storage, and particularly that provides access to combined (eliminating data not useful), block level data storage. A SAN typically has its own network of storage devices that are generally not accessible through the local area network (LAN) by other devices. The SAN allows access to these devices in a manner such that these devices appear to be locally attached to the endpoint device.

The domain proxy control system 101 may include transceiving equipment 113 capable of transmitting and receiving data wirelessly and/or otherwise through RF, cellular, Wi-Fi, Ethernet, and/or the like connections disclosed herein. The transceiving equipment 113 may include one or more antennas for wireless data transfer to communicate via RF, a cellular network (such as through a network such as a 5G, LTE, 4G, etc. network) a wireless provider network, and/or a mobile operator network, such as GSM, for example without limitation, to send and receive Short Message Service (SMS) messages or Unstructured Supplementary Service Data (USSD) messages. The domain proxy control system 101 may include one or more wireless communications interfaces, e.g., coupled to the one or more antennas, capable of communicating through the means disclosed herein.

In various embodiments, the domain proxy control system 101 may include one or more medium-specific controllers, each corresponding to a particular medium and configured to create electronic composites to transmit via the channel. For example, one of the elements of the domain proxy control system 101 may be a gateway that communicates with other elements of the network 100 through RF and/or other means using a communication module over the network(s) 120. The gateway may include a hardware and/or virtual software appliance installed at the domain proxy control system 101 and, in various embodiments, may correspond to the one or more coordination servers, may be integrated with the one or more coordination servers, or may be separate from but communicatively coupled to the one or more coordination servers. The gateway may be configured to operate as a control point for the interface between the system 101 and the other components of the network 100 while providing access security, data security, auditing and monitoring capabilities, and/or integration with external systems that are remotely located away from the domain proxy control system 101. In some embodiments, the gateway may include or correspond to API gateway configured to provide a service for provisioning and monitoring APIs (e.g., REST, HTTP, Web Socket, and/or the like APIs). The domain proxy control system 101 may be extended provide a multi-region deployment, with multiple instances of the components illustrated being configured for particular geographical regions. Thus, for example, multiple gateways, servers, databases/repositories, and/or the like may be deployed and configured to provide services to multiple regions.

As disclosed herein, in various embodiments, the domain proxy control system 101 may communicate with CBSDs 107, send notifications to CBSDs 107, cause presentations of content to users of CBSDs 107, expose data to CBSDs 107, prompt and receive input from CBSDs 107 and users of CBSDs 107, and/or the like. To facilitate such features, in various embodiments, an interface of a CBSD 107 may be configured to provide one or more display screen images that may each include one or more user interface elements. A user interface may include any text, image, and/or device that can be displayed on a display screen for providing information to a user and/or for receiving user input. A user interface may include one or more widgets, windows, dashboards, text, text boxes, text fields, tables, grids, charts, hyperlinks, buttons, lists, combo boxes, checkboxes, radio buttons, and/or the like.

The domain proxy control system 101 may control a set of one or more CBSDs 107 so that the set of one or more CBSDs 107 accesses a radio frequency band based at least in part on communicating with each CBSD 107 of the set of one or more CBSDs 107 via communications 134, 144 via one or more networks 120. In some cases, CBSDs 107 may transmit service requests 134 via the one or more networks 120 to the domain proxy control system 101. Additionally or alternatively, in some cases, the domain proxy control system 101 may initiate communications with CBSDs 107 by initially transmitting communications 144 via the one or more networks 120 to CBSDs 107. Accordingly, access onboarding may be initiated from either a CBSD 107 or the domain proxy control system 101 in various embodiments.

The domain proxy control system 101 may detect a set of one or more device parameters corresponding to CBSDs 107. For example, the domain proxy control system 101 may process one or more messages from a CBSD 107 and may collect device specifications corresponding to the CBSD 107. The domain proxy control system 101 may use the device specifications for onboarding of the CBSD 107. The device specifications may include information to be relayed automatically by the domain proxy control system 101 on behalf of the CBSD 107 to the SAS 102. The device specifications may include one or a combination of a model number of the CBSD 107, a serial number of the CBSD 107, location data corresponding to a location of the CBSD 107, a channel size requested, functional capabilities of the CBSD 107, indicia that the CBSD 107 (if CAT B) has been installed professionally with certified installer license number/credential information, and/or the like.

To facilitate the onboarding, the domain proxy control system 101 may communicate with the SAS 102 to provide the device specifications needed by the SAS 102 for allocation and to request access on behalf of the CBSD 107. In some embodiments, the domain proxy control system 101 may simply relay the device specifications and requests needed by the SAS 102 to the SAS 102. However, in some embodiments, the domain proxy control system 101 may determine, check, and confirm device specifications and requests prior to communicating such to the SAS 102. In cases where the device specifications requests from the CBSD 107 are lacking, insufficient, and/or not optimal for the given location, allocation state, and or the like, the domain proxy control system 101 may communicate further with the CBSD 107 to provide alternative/available options, request additional information, and identify sufficient and suitable device specifications and requests prior to communicating such to the SAS 102.

The domain proxy control system 101 and/or the SAS 102 may check and confirm the credentials passed by the CBSD 107. The domain proxy control system 101 and/or the SAS 102 may analyze the device specifications, request, and current allocation state. If access corresponding to a PAL is requested, the domain proxy control system 101 may have already determined whether the domain proxy control system 101 and/or the CBSD 107 have authorization for such access, but the SAS 102 may confirm authorization. In the case of authorization lacking for PAL access, the domain proxy control system 101 and/or the SAS 102 may determine that the request is for access to a general authorization (GA) channel. The domain proxy control system 101 and/or the SAS 102 may determine what access, frequency, PALs, GA access, and/or channels are available for the location of the CBSD 107. Ultimately, the domain proxy control system 101 and/or the SAS 102 may issue authorization to CBSD 107 to be able to active. Upon a determination that the CBSD 107 is permitted to use a portion of the spectrum, the domain proxy control system 101 may control the CBSD 107 to use the portion of the spectrum to transmit and receive data via the portion of the spectrum.

The technical improvements provided by the domain proxy control system 101 include improvements in adaptability and responsiveness of providing maximized access and usage of spectrum by CBSDs 107 while minimizing or eliminating CBSD-caused interference from CBSDs 107 in the population of CBSDs 107, as well as otherwise-caused interference experienced by CBSDs 107 and learned by the domain proxy control system 101. The domain proxy control system 101 may maximize spectrum usage, while load-balancing throughput, at least in part by dynamic brokering of access and allocation to the spectrum and/or intelligent coexistence group control.

Additionally, in some embodiments, the domain proxy control system 101 may facilitate control of blockchain-based access (e.g., blockchain-based PAL access). Disclosed embodiments may include the use of blockchain systems as mechanisms in conjunction with the other features disclosed herein to facilitate recording, confirming, and verifying one or a combination of the interactions disclosed herein, and accordingly provisioning RF access. One or more blockchain computers may be configured to one or more blockchain nodes of one or more blockchain networks. The one or more blockchain computers may facilitate access to one or more blockchains of the one or more blockchain networks. Whether for an hour or for a year, a PAL may be provisioned to a CBSD 107 to utilize that PAL for the specified time. The domain proxy control system 101 may be informed by the blockchain systems in order to provide functionalities such as reserving licenses, holding RF assignments, and/or the like to facilitate the blockchain-based access.

The domain proxy control system 101 may dynamically request from the SAS 102 access to spectrum licensed by one or more entities associated with the domain proxy control system 101 and under control of the domain proxy control system 101. The domain proxy control system 101 may receive spectrum usage requests from CBSDs 107. Such requests may specify usage for one or more CBSDs 107. Say, for example, a spectrum usage request specifies a population of ten CBSDs 107, the domain proxy control system 101 may communicate with the SAS 102 (e.g., communicating device parameters of the CBSDs 107, such as RF signal level metrics) to register the CBSDs 107 as a coexistence group and to obtain access authorization for a particular frequency and/or frequency range (i.e., a frequency assignment) for the set of the CBSDs 107. The domain proxy control system 101 may mitigate or prevent interference (e.g., adjacent channel interference and/or cross-link interference) among the population of ten CBSDs 107 and with respect to other CBSDs 107. To do so, the domain proxy control system 101 may determine a frequency assignment and/or operating parameters based at least in part on analyses of one or a combination of potential composite group combinations, locations, device parameters, synchronization and timing windows options, and/or the like.

The domain proxy service of the domain proxy control system 101 may be the technical solution by which coordination of CBSDs 107 in coexistence groups (also referenced as interference coexistence groups and coordination groups) may be accomplished. The domain proxy control system 101 may provide for and perform one or more centralized methods that include recognizing factors that indicate one or more advantages in coordinating particular CBSDs 107 devices with coexistence groups and that include facilitating coexistence groups. For example, the domain proxy control system 101 may determine, create, control onboarding to, update/modify, and terminate coexistence groups of CBSDs 107, participation therein by CBSDs 107, and coexistence composites corresponding to the coexistence groups and participation. As disclosed further herein, the domain proxy control system 101 may determine, create, control, modify, and/or otherwise coordinate coexistence groups as be function of one or a combination of frequency, time synchronization, code sequencing (e.g., PCI), power levels, polarization, and/or the like to allow for the CBSDs 107 to effectively co-exist. Further enhancements may include optimizations of such groups, solving for parameters such as total network throughput, reliability, efficiency, and/or the like across the group. Additionally, the domain proxy control system 101 may run continuous integration tests with the CBSDs 107 and potentially to the devices communicating with the CBSDs 107.

Figure 3:
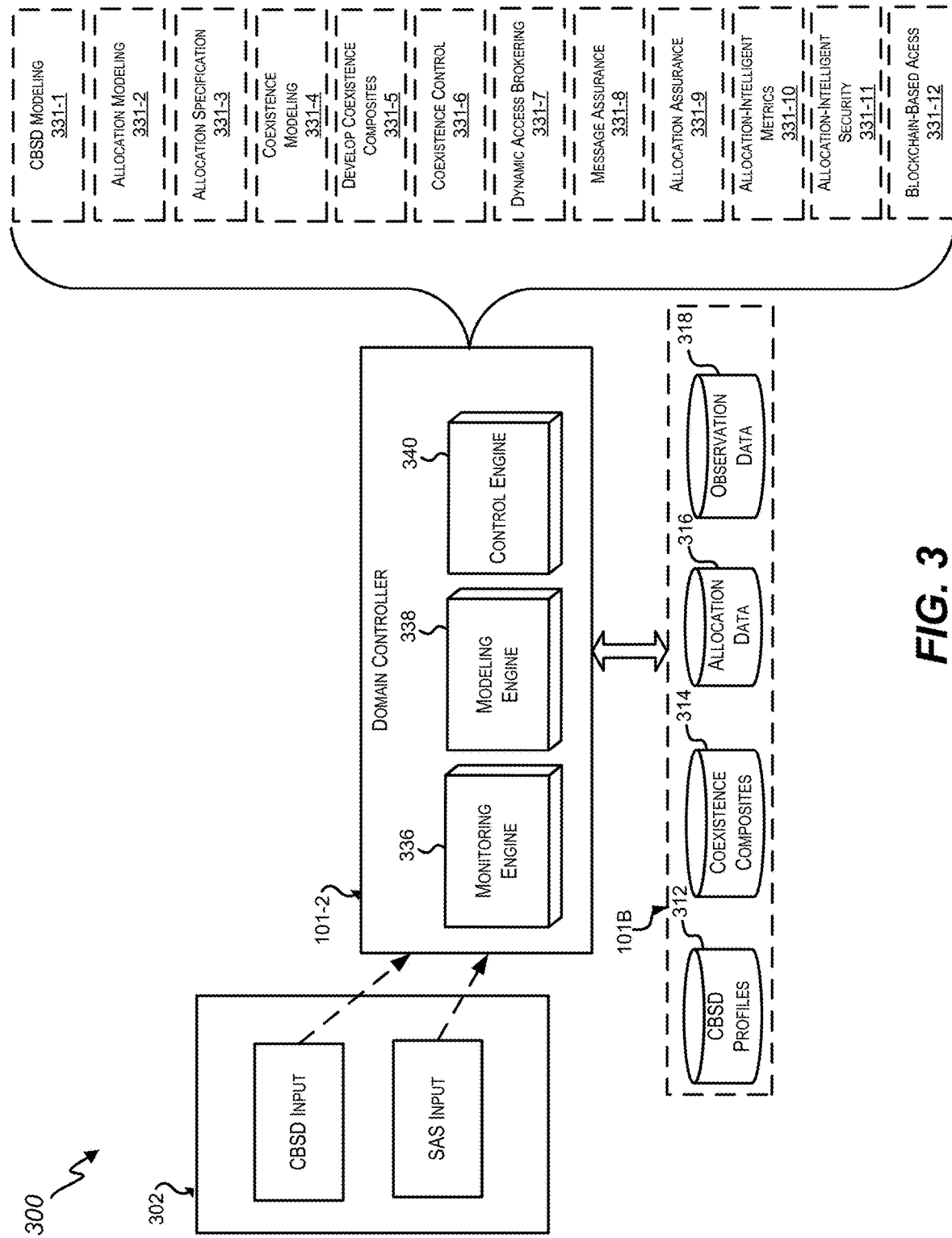
FIG. 3 illustrates a functional diagram of aspects of the domain proxy control system 101, in accordance with embodiments according to the present disclosure.

FIG. 3 shows a functional diagram of aspects of the domain proxy control system 101, in accordance with embodiments of the present disclosure. The domain proxy control system 101 may include one or more monitoring engines 336, one or more modeling engines 338, and/or one or more adaptation engines 340, which may be separate or integrated in various embodiments. In various embodiments, the one or more engines may correspond to executable code stored in one or more memories communicatively coupled with one or more processors. In some embodiments, the one or more engines may correspond to one or more servers of the server system with one or more of the servers configured to perform one or more of the features in accordance with embodiments disclosed herein.

The control engine 340 may be configured to facilitate the control features disclosed herein, including adaptive proxy controls 331 and communicating with the CBSDs 107 and the SAS 102. The control features may include a number of adaptive proxy controls 331 with respect to the CBSDs 107 as disclosed herein. The adaptive controls 331 provided by the domain proxy control system 101 may include one or a combination of CBSD modeling 331-1, access-load allocation modeling 1131-2, determining and specifying allocation configuration 1131-3, coexistence modeling 331-4, creating and updating coexistence composites 331-5, intelligent coexistence group control 331-6, dynamic brokering of access to spectrum 331-7, message assurance 331-8, access assurance 331-9, observability and allocation-intelligent learning and performance metrics 331-10, allocation-intelligent security 331-11, blockchain-based access 331-12, and/or the like. The monitoring engine 336 may be configured to monitor the components input 302 for any suitable aspects to facilitate improvements with features disclosed herein. For example, monitoring engine 336 may be configured to monitor and/or otherwise receive communications from the CBSDs 107 and the SAS 102. The monitoring engine 336 may aggregate, process, and consolidate components input 302 to facilitate creation, development, and/or use of CBSD profiles 312, coexistence composites 314, allocation data 316, and observation data 318, the operations of the modeling engine 338, and the adaptive controls 331.

The modeling engine 338 may be configured to perform the matching, modeling, learning, reasoning, and/or the like analyses features disclosed herein. The modeling engine 338 may be an analysis and matching engine that employs machine learning to process the components input 302 and/or data based at least in part thereon and received from the monitoring engine 336 and develop the CBSD profiles 312, coexistence composites 314, allocation data 316, and observation data 318. The modeling engine 338 may include or otherwise correspond to a learning engine that may employ an ongoing learning mode to create, update, confirm, correct, and/or refine CBSD profiles 312, coexistence composites 314, allocation data 316, and observation data 318. The modeling engine 338 may include a pattern-based reasoner may be employed to use various statistical techniques in analyzing the data, both current and historical, in order to infer particularized pattern data from the data 302. A transitive reasoner may be employed to infer relationships from a set of relationships to form the performance data. In various embodiments, the system automatically establishes and develops the particularized pattern data. In some embodiments, the modeling engine 338 may be configured to employ deep learning to process the data and derive the particularized pattern data corresponding to the CBSD profiles 312, coexistence composites 314, allocation data 316, and observation data 318.

Having identified CBSDs 107 via communications 134 and/or 144 disclosed herein, the domain proxy control system 101 may dynamically determine which CBSDs 107 should be in a particular coexistence group. The domain proxy control system 101 may allocate the CBSDs 107 into a particular coexistence group at least in part by communicating signals 144 to the identified CBSDs 107. In so doing, communications 144 to a particular CBSD 107 may include one or more specifications of one or a combination of the particular coexistence group, of one or more other CBSDs 107 identified for inclusion in the particular coexistence group, of one or more parameters contributing to the determination that the particular CBSD 107 and/or the one or more other CBSDs 107 should be allocated to the coexistence group, and/or the like. In some example instances, from a device perspective, the CBSD 107 can be in either group A or group B, and equivalent service may be provided to the CBSD 107 in either case. However, from the domain proxy service perspective, the domain proxy control system 101 may determine that two CBSDs 107, though mutually proximate, should belong in different groups so that each device can use a different channel so that, when another CBSD 107 needs to be added, the additional CBSD 107 may be assigned to one of the two existing groups rather than creating a new group just for the new CBSD 107.

Further, the domain proxy control system 101 may facilitate creating, updating/modifying, and/or terminating the particular coexistence group at least in part by communicating specifications of the particular coexistence group and/or the CBSDs 107 corresponding to the particular coexistence group to the SAS 102. The domain proxy control system 101 may control allocation of CBSDs 107 in real-time using adaptive protocols. The protocols may be based at least in part a precedence order of types and threshold values of parameters. Thus, the precedence order may be based at least in part on types and values of parameters corresponding to two or more CBSDs 107. By way of example, the parameters used by the domain proxy control system 101 to identify two or more CBSDs 107 that should be in a coexistence group together may include one or a combination of locations of the CBSDs 107, mutual physical proximity of the CBSDs 107, one or more frequencies and/or frequency bands used by the CBSDs 107, intended application(s) of the CBSDs 107, device type(s) of the CBSDs 107, capabilities of the CBSDs 107, abilities of the CBSDs 107 that allow for synchronizing timing of the CBSDs 107 (e.g., time division duplex (TDD) synchronization to allow for coexistence coordination and mitigation/ elimination of interference in the time domain), needs of the CBSDs 107 access that require or are improved by synchronizing timing of the CBSDs 107, time windows of anticipated and/or observed access operations of the CBSDs 107, code sequencing (e.g., PCI) of the CBSDs 107, power levels of the CBSDs 107, polarization of the CBSDs 107, distance(s) between the CBSDs 107, total network throughput across groups of CBSDs 107, reliability across groups of CBSDs 107, efficiency across groups of CBSDs 107, and/or the like.

Various embodiments may determine which CBSDs 107 should be in a particular coexistence group as a function of one or a combination of such parameters, which change depending on the current state of the coexistence group. For example, the current state could be non-existent (e.g., when the coexistence group has not yet been formed) or could include two or more CBSDs 107, each with one or more of the parameters potentially changing as a function of time. Such analyses and determinations may be performed prior to initial allocation of one or more of the CBSDs 107 and/or after initial allocation of one or more of the CBSDs 107 based at least in part on dynamically collected, observed, and learned feedback data from one or more of the CBSDs 107 that may, for example, signal changes to CBSD 107 states and/or parameters, changes to coexistence group states, and/or interference experienced by one or more CBSDs 107. In some instances, the domain proxy control system 101 may follow one or more protocols that are based at least in part a precedence order that is a function of patterns learned regarding particular CBSDs 107. Accordingly, the allocation control may be performed a priori and/or responsive to changes dynamically observed and learned by the domain proxy control system 101.

Thus, coexistence allocations that would not otherwise be performed may be controlled by the domain proxy control system 101. For example, the domain proxy control system 101 may detect CBSDs 107 in close mutual proximity and may cause coexistence collaboration of the CBSDs 107, which would not otherwise occur. By way of further example, the domain proxy control system 101 could coordinate ten CBSDs 107 around one particular facility with another facility across the street with another set of devices. Still further, access may be allocated based at least in part on usage level and particular timing, for example, when a busy time at a facility corresponds to a particular time window. Additional spectrum (e.g., for certain time windows) may be requested from the domain proxy control system 101 by one or more CBSDs 107 on-demand as needed. Responsive to such access requests, the domain proxy control system 101 may dynamically broker PAL and GAA access to the spectrum. Such access may have already been obtained by the domain proxy control system 101 from the SAS 102 and may be allocated by the domain proxy control system 101 provide for more elasticity in capacity on demand.

Access allocated to some types of CBSDs 107 may be orchestrated to synchronize timing of load and demand for a particular location, frequency/frequency range, time window, coexistence group, and/or the like. However, types of CBSDs 107 vary and, depending on the class of device, more or less coordination may be needed. Some classes of types of CBSDs 107 may not have the ability to synchronize timing. So, certain types of CBSDs 107 may be organized based on their ability to coordinate effectively.

The domain proxy control system 101 may form a plurality of coexistence composites 314, for example, one or more coexistence composites may be formed and updated for each coexistence group to facilitate various embodiments disclosed herein. For instance, the domain proxy control system 101 may determine a coexistence composite based at least in part on a set of one or more device parameters and may develop specifications corresponding to the coexistence composite. For example, the coexistence composites 314 may include or otherwise facilitate one or a combination of mapping of CBSDs 107 to coexistence groups and control of allocations to CBSDs 107. Each coexistence composite 314 may correspond to a data structure that may be stored in the data storage system 101B and that stores specifications corresponding to a corresponding coexistence group. In some embodiments, the data structure of a coexistence composite 314 may be a containerized data structure. In various embodiments, a coexistence composite 314 or a portion of thereof (e.g., one or more of the specifications) can be passed to and ingested by other systems and components. For example, all or a portion of a coexistence composite 314 may be communicated to the SAS 102 and/or one or more CBSDs 107 to facilitate various embodiments disclosed herein. For instance, the domain proxy control system 101 may communicate at least part of the specifications of the coexistence composite with the SAS 102 as disclosed herein. Consequent to the communicating with the SAS 102, the domain proxy control system 101 may identify a radio frequency assignment and operating parameters for the coexistence composite 314. All or a portion of the coexistence composite 314 may be communicated to one or more CBSDs 107 to facilitate presentation of one or more user interface options to accept or reject inclusion of the one or more CBSDs 107 in a coexistence group, to facilitate particularized access of the one or more CBSDs 107 as disclosed herein, including synchronization and timing windows, and/or the like. Consequent to one or more acceptance responses, the domain proxy control system 101 may control the one or more CBSDs 107 to access the radio frequency band in accordance with the radio frequency assignment and the operating parameters for the coexistence composite.

The composites 314 may include, for example, one or a combination of composite specifications that may, for example, define the composite group; digital identifiers, locations, device parameters, descriptors, and/or specifications of two or more CBSDs 107 potentially or actually included in the composite group; allocation specifications that may, for example, coordinate, define, and/or instruct CBSDs 107 in the composite group to effect the allocations to the CBSDs 107 (e.g., process specifications, RF resource specifications, and/or temporal specifications); and/or the like. For example, the process specifications may include process definitions and/or instructions particularized to specific CBSDs 107 to perform allocation operations in accordance with the determinations of the domain proxy control system 101. The allocation specifications may, for example, include provisional allocation designations and/or current allocation designations for the CBSDs 107. As another example, the resource specifications may specify a particular frequency and/or frequency range particularized to specific CBSDs 107. The temporal specifications may, for example, include one or more of indications of times (e.g., time windows, availability, start times, end times, durations, recurrence, etc.) and/or synchronization specifications of the processes and operations particularized to allocations to specific CBSDs 107.

Figure 4:
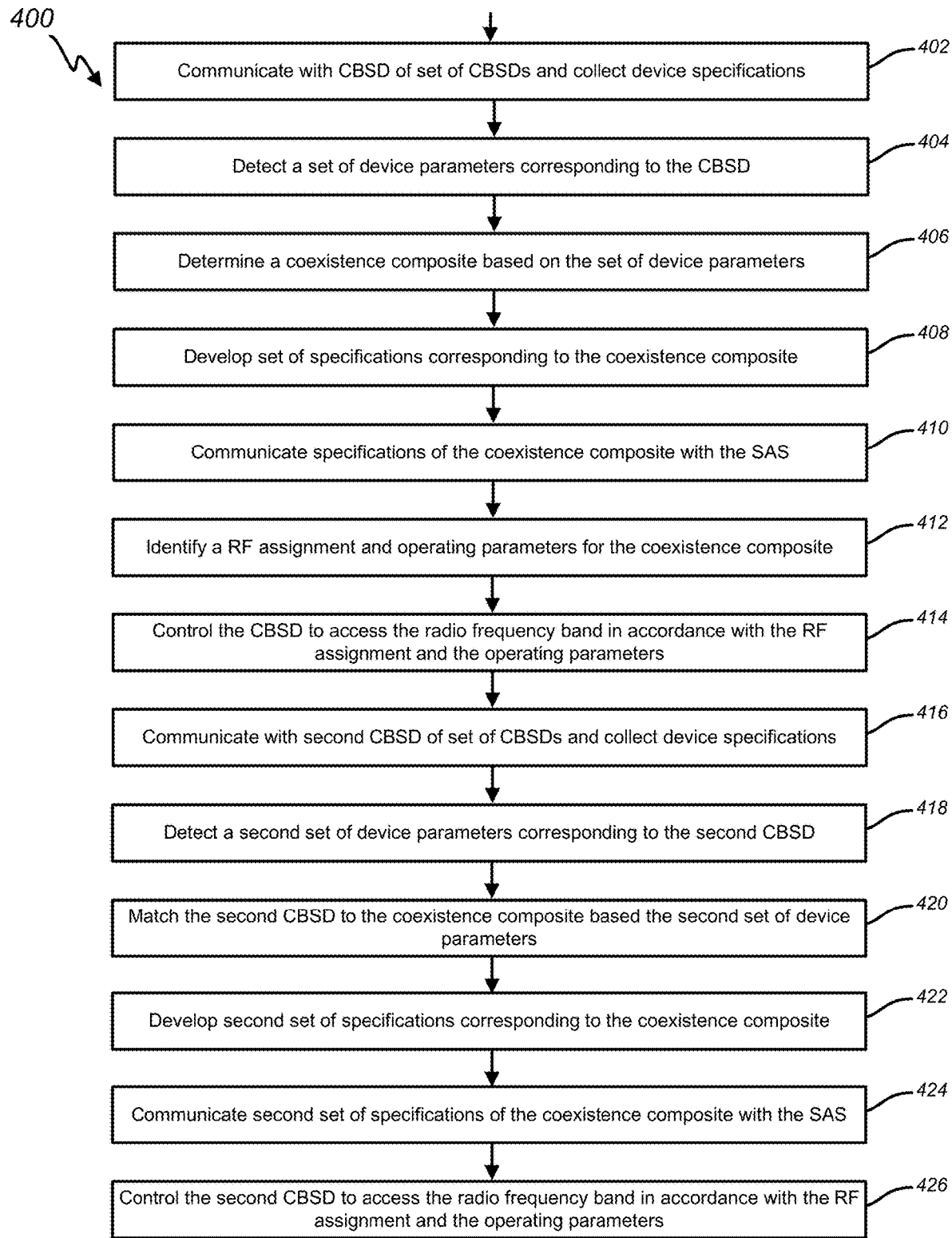
FIG. 4 illustrates a block diagram of an example method of certain features directed to controlling use of a radio frequency band, in accordance with embodiments according to the present disclosure.

To further illustrate some example operations and features of the domain proxy control system 101, FIG. 4 is a block diagram that illustrates an example method 400 of certain features directed to controlling use of a radio frequency band, in accordance with some example embodiments according to the present disclosure. According to certain embodiments, the method 400 may begin as indicated by block 402. However, teachings of the present disclosure may be implemented in a variety of configurations. As such, the order of the steps comprising the method 400 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

In various embodiments, the domain proxy control system 101 may control a set of one or more CBSDs 107 so that the set of one or more CBSDs 107 accesses a radio frequency band based at least in part on one or a combination of the following. As indicated by block 402, the domain proxy control system 101 may communicate with a CBSD 107 of the set of one or more CBSDs 107 and collect device specifications corresponding to the CBSD 107, as disclosed herein. As indicated by block 403, the domain proxy control system 101 may detect a set of one or more device parameters corresponding to the CBSD 107, as disclosed herein, such as a specification of a location of the CBSD 107. As indicated by block 406, the domain proxy control system 101 may determine a coexistence composite based at least in part on the set of one or more device parameters. As indicated by block 408, the domain proxy control system 101 may develop specifications corresponding to the coexistence composite. As indicated by block 410, the domain proxy control system 101 may communicate at least part of the specifications of the coexistence composite with the SAS 102. As indicated by block 412, consequent to the communicating with the SAS 102, the domain proxy control system 101 may identify a radio frequency assignment and operating parameters for the coexistence composite. As indicated by block 414, the domain proxy control system 101 may control the CBSD 107 to access the radio frequency band in accordance with the radio frequency assignment and the operating parameters for the coexistence composite.

Further, the set of CBSDs 107 may initially include a plurality of CBSDs 107 identified by the domain proxy control system 101, or may initially include only the one CBSD 107 and the domain proxy control system 101 may subsequently identify one or more additional CBSDs 107 to include in the set. In either case, the domain proxy control system 101 may control use of a radio frequency band by a plurality of CBSDs 107. Thus, for example, as indicated by block 416, the domain proxy control system 101 may communicate with a second CBSD 107 of the set of CBSDs 107 and collect second device specifications corresponding to the second CBSD 107. As indicated by block 418, the domain proxy control system 101 may detect a second set of one or more device parameters corresponding to the second CBSD 107. As indicated by block 420, the domain proxy control system 101 may match the second CBSD 107 to the coexistence composite based at least in part on the second set of one or more device parameters. Based at least in part on the matching, the domain proxy control system 101 may develop a second set of specifications corresponding to the coexistence composite, as indicated by block 422. As indicated by block 424, the domain proxy control system 101 may communicate at least part of the second set of specifications of the coexistence composite with the SAS 102. Consequent to the communicating with the SAS 102, the domain proxy control system 101 may control the second CBSD 107 to access the radio frequency band in accordance with the radio frequency assignment and the operating parameters and/or a second set of operating parameters for the coexistence composite, as indicated by block 426.

In various embodiments, prior to the communicating the at least part of the specifications of the coexistence composite with the SAS 102 or at least prior to the controlling the CBSDs 107 to access the radio frequency band, the domain proxy control system 101 may communicate content corresponding to the coexistence composite to the CBSDs 107. The coexistence composite and the corresponding coexistence group of CBSDs 107 may only be provisional until the CBSDs 107 accept inclusion in the coexistence group. Accordingly, the content may be transmitted to indicate the provisional coexistence group to the CBSDs 107 and to cause display/output of corresponding interface elements. The interface elements may include at least one user-selectable interface element for presentation with the CBSDs 107 that may correspond to an option to acknowledge the coordination according to the coexistence composite. Selections responsive to the outputting of the visual output of at least one of the one or more user-selectable interface elements may be received, with communications transmitted from the CBSDs 107 to the domain proxy control system 101. Subsequent to the domain proxy control system 101 identifying an acknowledgement of the coexistence composite by the CBSDs 107, the domain proxy control system 101 may transform the provisional coexistence composite into an active coexistence composite and may then proceed with further operations according to the coexistence composite to control the CBSDs 107 to access the radio frequency band in accordance with the radio frequency assignment and the operating parameters for the coexistence composite.

Various embodiments of the domain proxy control system 101 may further provide for RF access and message assurance features that improve reliability and consistency of RF access accorded to the CBSDs 107. The domain proxy control system 101 may perform some of the messaging functions as a proxy for the functionality from the CBSDs 107, and encapsulating that within the domain proxy service of the domain proxy control system 101. Under current protocols, each CBSD 107 utilizing the spectrum is required to communicate with the SAS 102 regularly for continued access; there must be a heartbeat exchange between each CBSD 107 and the SAS 102. The CBSD 107 must cease using the CBRS spectrum within a predetermined amount of time if the CBSD 107 cannot confirm with its regular communications to the SAS 102 that the grant of access continues and/or if the SAS 102 issues a command to cease using the CBRS spectrum.

However, the domain proxy control system 101 may communicate with the SAS 102 on behalf of the CBSDs 107 to ensure that the regular heartbeat exchange communications are maintained. The domain proxy control system 101 may ensure that such proxy communications with the SAS 102 are maintained, even when interruptions occur with the heartbeat communications from a CBSD 107 such that the CBSD 107 stops sending the heartbeat communications to the domain proxy control system 101 for a temporary period of time. The buffering functionality provided by the domain proxy control system 101 may be bidirectional. For example, if a CBSD 107 loses power because of a storm, it can no longer send heartbeat requests. If not for the buffering functionality of the domain proxy control system 101, the CBSD 107 may lose access to its license. However, the domain proxy control system 101 may alleviate the dearth of messages by continuing to hold the reservation with the SAS 102.

Figure 5:
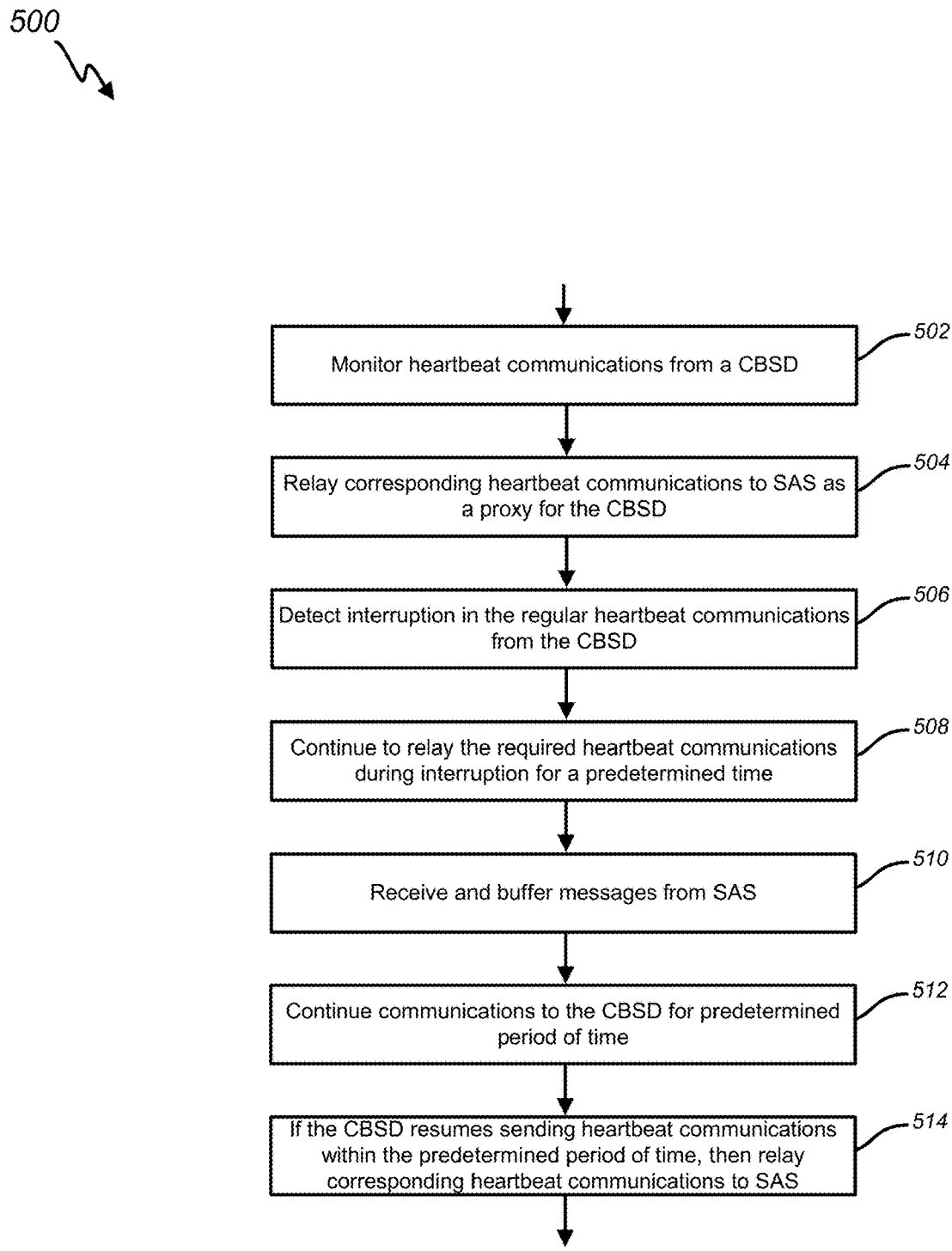
FIG. 5 illustrates a block diagram of an example method of certain assurance features of the domain proxy control system, in accordance with some example embodiments according to the present disclosure.

To further illustrate some example operations and features of the domain proxy control system 101, FIG. 5 is a block diagram that illustrates an example method 500 of certain assurance features of the domain proxy control system 101, in accordance with some example embodiments according to the present disclosure. In some embodiments, the method 500 may be a continuation of the method 400.

As indicated by block 502, the domain proxy control system 101 may monitor heartbeat communications from a CBSD 107. When heartbeat communications are received from the CBSD 107, the domain proxy control system 101 may relay corresponding heartbeat communications to the SAS 102 as a proxy for the CBSD 107, as indicated by block 504. The domain proxy control system 101 may continue such proxy communications under normal circumstances. However, the domain proxy control system 101 may determine when an interruption in the regular heartbeat communications from the CBSD 107 occurs, detecting the interruption, as indicated by block 506. In that event, the domain proxy control system 101 may continue to relay the required heartbeat communications to the SAS 102 during the interruption, as indicated by block 508. Such proxy communications during the interruption may continue for a predetermined period of time, which may correspond to any suitable amount of time (e.g., X number of minutes, hours, etc.). Accordingly, the domain proxy control system 101 may provide a buffer against such temporary interruptions and continue proxy communications with the SAS 102 to preserve access to the spectrum channel allocated by the SAS 102.

Additionally, vice versa, messages from the SAS 102 may be buffered so that they may be properly received by the CBSD 107. As indicated by block 510, the domain proxy control system 101 may receive and buffer messages from the SAS 102. The domain proxy control system 101 may ensure that messages to the CBSD 107 are received rather than lost due to the lack of a feedback mechanism of the SAS 102. As indicated by block 512, the domain proxy control system 101 may require an ack-back communication from the CBSD 107 to confirm reception, and, in the event that no ack-back communication is received from the CBSD 107, the domain proxy control system 101 may re-send the message to the CBSD 107.

If the CBSD 107 resumes sending heartbeat communications within the predetermined period of time, the domain proxy control system 101 may further relay corresponding heartbeat communications to the SAS 102 as normal, as indicated by block 514. However, when the predetermined period of time expires without the CBSD 107 resuming sending heartbeat communications, the domain proxy control system 101 may cease sending the proxy communications. In such a circumstance, the CBSD 107 may lose access as it would under normal circumstances without the proxy indications, and subsequent access may be reinitiated when appropriate.

Additionally or alternatively, the domain proxy control system 101 may further provide access assurance in spite of shutdowns caused by the SAS 102. Under current protocols, the SAS 102 may cause shutdown of the CBSDs 107 in two main ways: by sending a shutdown command or by stopping sending heartbeat authorizations. If a CBSD 107 does not receive an authorized heartbeat within a specified amount of time, the CBSD 107 is required to shut itself down automatically. The domain proxy control system 101 may relay such shutdown commands to the CBSDs 107. For example, in the case that the SAS 102 stops sending authorizations, the domain proxy control system 101 may likewise stop sending authorizations to the CBSD 107. In the case that the SAS 102 issues a shutdown command, the domain proxy control system 101 may likewise relay the shutdown command to the CBSD 107. However, in some embodiments, the domain proxy control system 101 may facilitate continued access by using an alternative path to communicate with the CBSD 107 and buffering the CBSD 107 so that the CBSD 107 is not impacted by the shutdown event. The domain proxy control system 101 may identify alternative frequency assignment for the CBSD 107 and smoothly transition the CBSD 107 to the alternative frequency assignment such that the CBSD 107 does not experience a disruption of access. In various embodiments, the reassignment may be set up with the SAS 102 responsive to the shutdown event and/or may have already been obtained by the domain proxy control system 101 from the SAS 102 as part of the program features disclosed herein.

Another set of features of the domain proxy control system 101 may correspond to the ability of the domain proxy control system 101 to observe, collecting observation data over time, and learning patterns to better control coexistence groups and preempt interference, security breaches, and/or the like. The domain proxy control system 101 may observe and learn operational patterns of particular CBSDs 107 and determine whether a particular CBSD 107 is operating normal, whether the equipment is malfunctioning, the quality of the transport used to communicate with the CBSD 107, and/or the like. The domain proxy control system 101 may run traces from the domain proxy control system 101 may service to the CBSD 107 and back. The domain proxy control system 101 may determine metrics for the CBSD 107 based at least in part on the collected observation data, aggregate the metrics, and generate reports based at least in part on those metrics for the individual CBSD 107 and sets of CBSDs 107 (e.g., coexistence groups).

In addition to control-plane messages, some embodiments may process data-plane messages. Deep packet inspectors of the domain proxy control system 101 may be installed on the data plane traffic for security vulnerability analyses, traceability, configuration/stability/quality of experience analyses, backhaul quality analyses, and/or the like. User-plane traffic from the CBSDs 107 may be routed through the domain proxy control system 101 in some embodiments. In some embodiments, an instantiation of the domain proxy control system 101 may be located close to the network location of the CBSDs 107 to better facilitate access to the data plane.

With the security services provided by the domain proxy control system 101 to CBSDs 107, the domain proxy control system 101 may change communication protocols with respect to CBSDs 107 independently. Like public key encryption, as long as the domain proxy control system 101 can communicate with a CBSD 107, that information need not be published to another system (e.g., to the SAS 102), which may or may not be considered trustworthy. The domain proxy control system 101 can change security dynamically responsive to trigger events (the domain proxy control system 101 discovering a new threat, a backdoor vulnerability, etc.) to address the trigger events (e.g., to address threats, close backdoors, etc.). Accordingly, the domain proxy control system 101 may provide a mechanism by which policy changes can be enforced.

Figure 6:
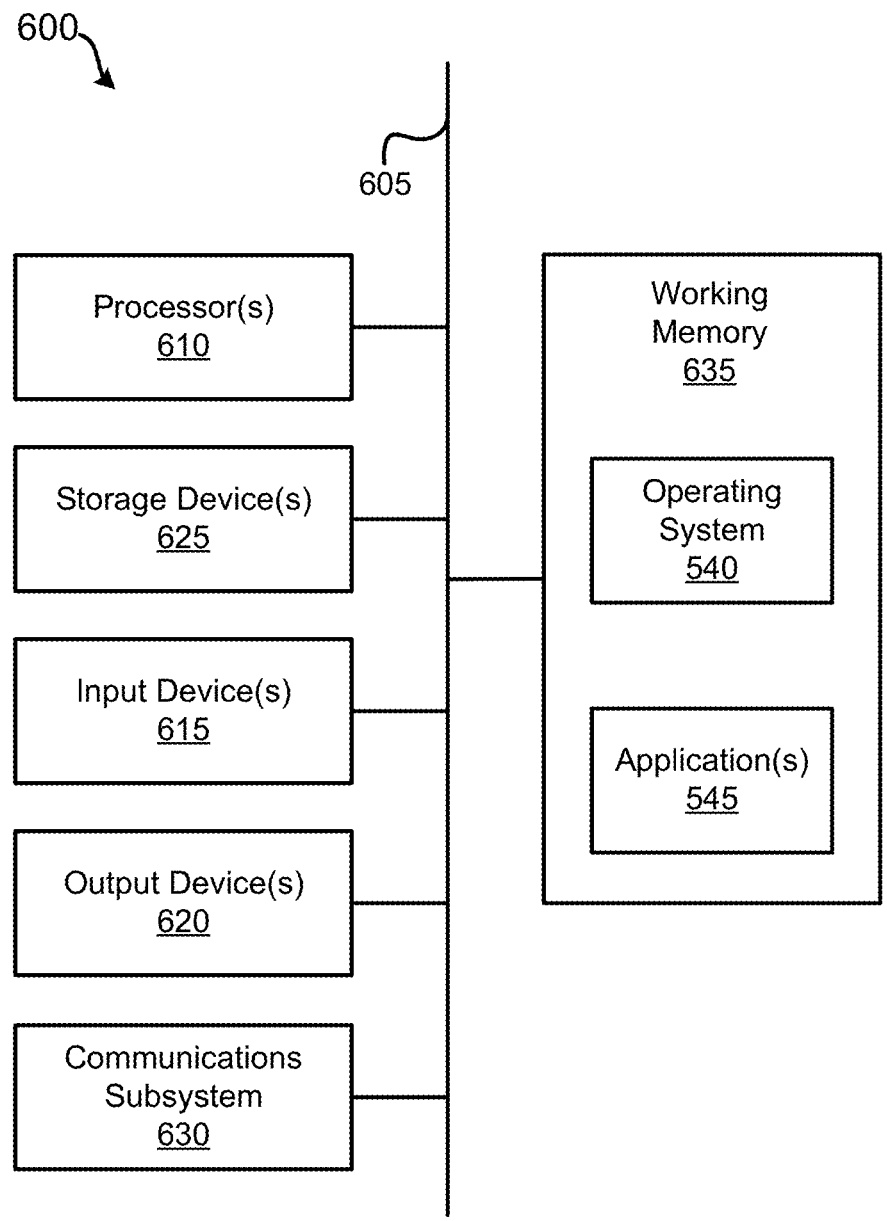
FIG. 6 illustrates a computer system, in accordance with embodiments according to the present disclosure.

A computer system as illustrated in FIG. 6 may be incorporated as part of the previously described computerized devices. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data storages, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "machine-readable media," "computer-readable storage medium," "computer-readable storage media," "computer-readable medium," "computer-readable media," "processor-readable medium," "processor-readable media," and/or like terms as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate controlling use of a radio frequency band, the system comprising:
    one or more processing devices; and
    memory communicatively coupled with and readable by the one or more processing devices and having stored therein processor-readable instructions which, when executed by the one or more processing devices, cause the one or more processing devices to perform operations comprising:
        communicating with a communication device of a set of one or more communication devices and collecting device specifications corresponding to the communication device, where each communication device of the set of one or more communication devices is adapted to communicate via radio frequency communications;
        detecting a set of one or more device parameters corresponding to the communication device, the set of one or more device parameters comprising a specification of a location of the communication device;
        determining a coexistence composite based at least in part on the set of one or more device parameters;

developing specifications corresponding to the coexistence composite;

communicating at least part of the specifications of the coexistence composite with a radio frequency allocation system;

consequent to the communicating with the radio frequency allocation system, identifying a radio frequency assignment and operating parameters for the coexistence composite;

controlling the communication device to access a radio frequency band in accordance with the radio frequency assignment and the operating parameters for the coexistence composite;

matching a second communication device to the coexistence composite based at least in part on a second set of one or more device parameters; and based at least in part on the matching, developing a second set of specifications corresponding to the coexistence composite.

2. The system to facilitate controlling use of a radio frequency band as recited in claim 1, the operations further comprising:

controlling the set of one or more communication devices so that the set of one or more communication devices accesses the radio frequency band.

3. The system to facilitate controlling use of a radio frequency band as recited in claim 1, the operations further comprising:

communicating with a second communication device of the set of one or more communication devices and collecting second device specifications corresponding to the second communication device; and detecting the second set of one or more device parameters corresponding to the second communication device.

4. The system to facilitate controlling use of a radio frequency band as recited in claim 3, the operations further comprising:

communicating at least part of the second set of specifications of the coexistence composite with the radio frequency allocation system; and consequent to the communicating with the radio frequency allocation system, controlling the second communication device to access the radio frequency band in accordance with the radio frequency assignment and the operating parameters and/or a second set of operating parameters for the coexistence composite.

5. The system to facilitate controlling use of a radio frequency band as recited in claim 1, the operations further comprising:

prior to the controlling the communication device to access the radio frequency band, communicating content corresponding to the coexistence composite to the communication device; and receiving a response from the communication device and identifying an acknowledgement of the coexistence composite;

where one or both of the communicating the at least part of the specifications of the coexistence composite with the radio frequency allocation system and the controlling the communication device to access the radio frequency band is contingent on the acknowledgement.

6. The system to facilitate controlling use of a radio frequency band as recited in claim 1, the operations further comprising:

monitoring heartbeat communications from the communication device; and relaying corresponding heartbeat communications to the radio frequency allocation system as a proxy for the communication device.

7. The system to facilitate controlling use of a radio frequency band as recited in claim 6, the operations further comprising:

detecting an interruption in the heartbeat communications from the communication device; and continuing to relay the corresponding heartbeat communications to the radio frequency allocation system during the interruption.

8. A method to facilitate controlling use of a radio frequency band, the method comprising:

communicating, by a domain controller, with a communication device of a set of one or more communication devices and collecting device specifications corresponding to the communication device, where each communication device of the set of one or more communication devices is adapted to communicate via radio frequency communications;

detecting, by the domain controller, a set of one or more device parameters corresponding to the communication device, the set of one or more device parameters comprising a specification of a location of the communication device;

determining, by the domain controller, a coexistence composite based at least in part on the set of one or more device parameters;

developing, by the domain controller, specifications corresponding to the coexistence composite;

communicating, by the domain controller, at least part of the specifications of the coexistence composite with a radio frequency allocation system;

consequent to the communicating with the radio frequency allocation system, identifying, by the domain controller, a radio frequency assignment and operating parameters for the coexistence composite;

controlling, by the domain controller, the communication device to access a radio frequency band in accordance with the radio frequency assignment and the operating parameters for the coexistence composite;

matching, by the domain controller, a second communication device to the coexistence composite based at least in part on a second set of one or more device parameters; and based at least in part on the matching, developing, by the domain controller, a second set of specifications corresponding to the coexistence composite.

9. The method to facilitate controlling use of a radio frequency band as recited in claim 8, further comprising:

controlling, by the domain controller, the set of one or more communication devices so that the set of one or more communication devices accesses the radio frequency band.

10. The method to facilitate controlling use of a radio frequency band as recited in claim 8, further comprising:

communicating, by the domain controller, with a second communication device of the set of one or more communication devices and collecting second device specifications corresponding to the second communication device; and detecting, by the domain controller, the second set of one or more device parameters corresponding to the second communication device.

11. The method to facilitate controlling use of a radio frequency band as recited in claim 10, further comprising:

communicating, by the domain controller, at least part of the second set of specifications of the coexistence composite with the radio frequency allocation system; and consequent to the communicating with the radio frequency allocation system, controlling, by the domain controller, the second communication device to access the radio frequency band in accordance with the radio frequency assignment and the operating parameters and/or a second set of operating parameters for the coexistence composite.

12. The method to facilitate controlling use of a radio frequency band as recited in claim 8, further comprising:

prior to the controlling the communication device to access the radio frequency band, communicating, by the domain controller, content corresponding to the coexistence composite to the communication device; and receiving, by the domain controller, a response from the communication device and identifying an acknowledgement of the coexistence composite;

where one or both of the communicating the at least part of the specifications of the coexistence composite with the radio frequency allocation system and the controlling the communication device to access the radio frequency band is contingent on the acknowledgement.

13. The method to facilitate controlling use of a radio frequency band as recited in claim 8, further comprising:

monitoring, by the domain controller, heartbeat communications from the communication device; and relaying, by the domain controller, corresponding heartbeat communications to the radio frequency allocation system as a proxy for the communication device.

14. The method to facilitate controlling use of a radio frequency band as recited in claim 13, further comprising:

detecting, by the domain controller, an interruption in the heartbeat communications from the communication device; and continuing, by the domain controller, to relay the corresponding heartbeat communications to the radio frequency allocation system during the interruption.

15. One or more non-transitory, machine-readable media having machine-readable instructions thereon which, when executed by one or more processing devices, cause the one or more processing devices to perform operations comprising:

communicating with a communication device of a set of one or more communication devices and collecting device specifications corresponding to the communication device, where each communication device of the set of one or more communication devices is adapted to communicate via radio frequency communications;

detecting a set of one or more device parameters corresponding to the communication device, the set of one or more device parameters comprising a specification of a location of the communication device;

determining a coexistence composite based at least in part on the set of one or more device parameters;

developing specifications corresponding to the coexistence composite;

communicating at least part of the specifications of the coexistence composite with a radio frequency allocation system;

consequent to the communicating with the radio frequency allocation system, identifying a radio frequency assignment and operating parameters for the coexistence composite;

controlling the communication device to access a radio frequency band in accordance with the radio frequency assignment and the operating parameters for the coexistence composite;

matching a second communication device to the coexistence composite based at least in part on a second set of one or more device parameters; and based at least in part on the matching, developing a second set of specifications corresponding to the coexistence composite.

16. The one or more non-transitory, machine-readable media as recited in claim 15, the operations further comprising:

controlling the set of one or more communication devices so that the set of one or more communication devices accesses the radio frequency band.

17. The one or more non-transitory, machine-readable media as recited in claim 15, the operations further comprising:

communicating with a second communication device of the set of one or more communication devices and collecting second device specifications corresponding to the second communication device; and detecting the second set of one or more device parameters corresponding to the second communication device.

18. The one or more non-transitory, machine-readable media as recited in claim 17, the operations further comprising:

communicating at least part of the second set of specifications of the coexistence composite with the radio frequency allocation system; and consequent to the communicating with the radio frequency allocation system, controlling the second communication device to access the radio frequency band in accordance with the radio frequency assignment and the operating parameters and/or a second set of operating parameters for the coexistence composite.

19. The one or more non-transitory, machine-readable media as recited in claim 15, the operations further comprising:

prior to the controlling the communication device to access the radio frequency band, communicating content corresponding to the coexistence composite to the communication device; and receiving a response from the communication device and identifying an acknowledgement of the coexistence composite;

where one or both of the communicating the at least part of the specifications of the coexistence composite with the radio frequency allocation system and the controlling the communication device to access the radio frequency band is contingent on the acknowledgement.

20. The one or more non-transitory, machine-readable media as recited in claim 15, the operations further comprising:

monitoring heartbeat communications from the communication device; and relaying corresponding heartbeat communications to the radio frequency allocation system as a proxy for the communication device.

21. A system comprising:

one or more processing devices; and memory communicatively coupled with and readable by the one or more processing devices and having stored therein processor-readable instructions which, when executed by the one or more processing devices, cause the one or more processing devices to perform operations comprising:
  communicating with a communication device of a set of one or more communication devices and collecting device specifications corresponding to the communication device, where each communication device of the set of one or more communication devices is adapted to communicate via radio frequency communications;
  detecting a set of one or more device parameters corresponding to the communication device, the set of one or more device parameters comprising a specification of a location of the communication device;
  determining a coexistence composite based at least in part on the set of one or more device parameters;
  developing specifications corresponding to the coexistence composite;
  communicating at least part of the specifications of the coexistence composite with a radio frequency allocation system;
  consequent to the communicating with the radio frequency allocation system, identifying a radio frequency assignment and operating parameters for the coexistence composite; and
  controlling the communication device to access a radio frequency band in accordance with the radio frequency assignment and the operating parameters for the coexistence composite;
  where one or both of the communicating the at least part of the specifications of the coexistence composite with the radio frequency allocation system and the controlling the communication device to access the radio frequency band is contingent on receiving an acknowledgement from the communication device prior to the controlling the communication device to access the radio frequency band.

22. A method comprising:
communicating with a communication device of a set of one or more communication devices and collecting device specifications corresponding to the communication device, where each communication device of the set of one or more communication devices is adapted to communicate via radio frequency communications;
detecting a set of one or more device parameters corresponding to the communication device, the set of one or more device parameters comprising a specification of a location of the communication device;
determining a coexistence composite based at least in part on the set of one or more device parameters;
developing specifications corresponding to the coexistence composite;
communicating at least part of the specifications of the coexistence composite with a radio frequency allocation system;
consequent to the communicating with the radio frequency allocation system, identifying a radio frequency assignment and operating parameters for the coexistence composite; and
controlling the communication device to access a radio frequency band in accordance with the radio frequency assignment and the operating parameters for the coexistence composite;
where one or both of the communicating the at least part of the specifications of the coexistence composite with the radio frequency allocation system and the controlling the communication device to access the radio frequency band is contingent on receiving an acknowledgement from the communication device prior to the controlling the communication device to access the radio frequency band.

23. A system comprising:
one or more processing devices; and
memory communicatively coupled with and readable by the one or more processing devices and having stored therein processor-readable instructions which, when executed by the one or more processing devices, cause the one or more processing devices to perform operations comprising:
  communicating with a communication device of a set of one or more communication devices and collecting device specifications corresponding to the communication device, where each communication device of the set of one or more communication devices is adapted to communicate via radio frequency communications;
  detecting a set of one or more device parameters corresponding to the communication device, the set of one or more device parameters comprising a specification of a location of the communication device;
  determining a coexistence composite based at least in part on the set of one or more device parameters;
  developing specifications corresponding to the coexistence composite;
  communicating at least part of the specifications of the coexistence composite with a radio frequency allocation system;
  consequent to the communicating with the radio frequency allocation system, identifying a radio frequency assignment and operating parameters for the coexistence composite;
  controlling the communication device to access a radio frequency band in accordance with the radio frequency assignment and the operating parameters for the coexistence composite;
  detecting an interruption in a heartbeat communications from the communication device; and
  continuing to relay corresponding heartbeat communications to the radio frequency allocation system during the interruption.

24. A method comprising:
communicating with a communication device of a set of one or more communication devices and collecting device specifications corresponding to the communication device, where each communication device of the set of one or more communication devices is adapted to communicate via radio frequency communications;
detecting a set of one or more device parameters corresponding to the communication device, the set of one or more device parameters comprising a specification of a location of the communication device;
determining a coexistence composite based at least in part on the set of one or more device parameters;
developing specifications corresponding to the coexistence composite;
communicating at least part of the specifications of the coexistence composite with a radio frequency allocation system;
consequent to the communicating with the radio frequency allocation system, identifying a radio frequency assignment and operating parameters for the coexistence composite;

controlling the communication device to access a radio frequency band in accordance with the radio frequency assignment and the operating parameters for the coexistence composite;

detecting an interruption in a heartbeat communications from the communication device; and continuing to relay corresponding heartbeat communications to the radio frequency allocation system during the interruption.

* * * * *